(12) United States Patent
Eswaran et al.

(10) Patent No.: US 6,893,479 B2
(45) Date of Patent: May 17, 2005

(54) INTEGRATED METHOD FOR PRODUCTION OF CARRAGEENAN AND LIQUID FERTILIZER FROM FRESH SEAWEEDS

(75) Inventors: Karuppanan Eswaran, Bhavnagar (IN); Pushpito Kumar Ghosh, Bhavnagar (IN); Arup Kumar Siddhanta, Bhavnagar (IN); Jinalal Shambhubhai Patolia, Bhavnagar (IN); Chellaiah Periyasamy, Bhavnagar (IN); Aditya Shantibhai Mehta, Bhavnagar (IN); Kalpana Haresh Mody, Bhavnagar (IN); Bharatkumar Kalidas Ramavat, Bhavnagar (IN); Kamalesh Prasad, Bhavnagar (IN); Mahesh Rameshchandra Rajyaguru, Bhavnagar (IN); Singaram Kulandaivel Chennur Radhakrishna Reddy, Bhavnagar (IN); Jayant Batukrai Pandya, Bhavnagar (IN); Akhilesh Tewari, Bhavnagar (IN)

(73) Assignee: Council of Scientific & Industrial Research, New Delhi (IN)

( * ) Notice: Subject to any disclaimer, the term of this patent is extended or adjusted under 35 U.S.C. 154(b) by 199 days.

(21) Appl. No.: 10/222,977

(22) Filed: Aug. 19, 2002

(65) Prior Publication Data

US 2004/0031302 A1 Feb. 19, 2004

(51) Int. Cl.$^7$ .............................................. C05F 11/00
(52) U.S. Cl. ........................................... 71/23; 71/64.1
(58) Field of Search ..................................... 71/23, 64.1

(56) References Cited

U.S. PATENT DOCUMENTS 3,630,710 A * 12/1971 Frederickson .................. 71/23
5,201,930 A * 4/1993 Campbell ...................... 71/23

FOREIGN PATENT DOCUMENTS

GB            2150552      *   7/1985

OTHER PUBLICATIONS

Comline Biotechnology & Medical, Jan. 14, 1998.*
Sumera et al., "Extraction and Partial Characterization of Auxin–Like Substances from *Sargassum polycystum* C. Ag.," *Botanica Marina*, 1981, pp. 157–163, vol. XXIV, Walter de Gruyter & Co, Berlin • New York.

Dawes et al., "Seasonal and Reproductive Aspects of Plant Chemistry, and *i*–Carrageenan from Floridian *Eucheuma* (Rhodophyta, Gigartinales)," *Botanica Marina*, 1977, pp. 137–147, vol. XX, Walter de Gruyter & Co, Berlin • New York.

Craigie et al., *Handbook of Phycological Methods*, 1978, pp. 112–131, Cambridge University Press, London.

Lewis et al., "Commerical production and applications of algal hydrocolloids," *Algae and Human Affairs*, 1990, pp. 218–236, Cambridge University Press, Cambridge.

Matting et al., "Seaweed use in agriculture and horticulture," *Algae and Human Affairs*, 1990, pp. 357–370, Cambridge University–Press, Cambridge.

Chapman et al., "Seaweed as Animal Fodder. Manure and for Energy," *Seaweeds and Their Uses*, 1980, pp. 30–61, Chapter 2, Chapman and Hall, London • New York.

Whistler et al., "Polysaccharides and Their Derivatives," *Industrial Gums*, 1993, pp. 145–180, $3_{rd}$ Edition, Academic Press Inc., New York.

Blunden, "Cytokinin Activity of Seaweed Extracts," *Marine Natural Products Chemistry*, 1977, pp. 337–344, $3^{rd}$ Edition, Plenum Press, New York.

* cited by examiner

Primary Examiner—C. Sayala
(74) Attorney, Agent, or Firm—Foley & Lardner LLP

(57) ABSTRACT

An integrated method is developed to utilize to a maximum extent the fresh biomass of seaweeds such as *Kappaphycus alvarezii* that can be crushed to release sap and where the sap is useful as a potent liquid fertilizer after suitable treatment with additives and dilution while the residue is a superior raw material for extraction of κ-carrageenan, thereby enhancing the value of the seaweed. Other advantages of the invention include a reduced drying time and drying area to obtain the raw material for κ-carrageenan production in dry and storable form, a reduced cost of transporting and storing this raw material because of its lesser bulk, easier handling due to its free flowing granular nature, and its direct use for gel preparation in certain applications.

23 Claims, 1 Drawing Sheet

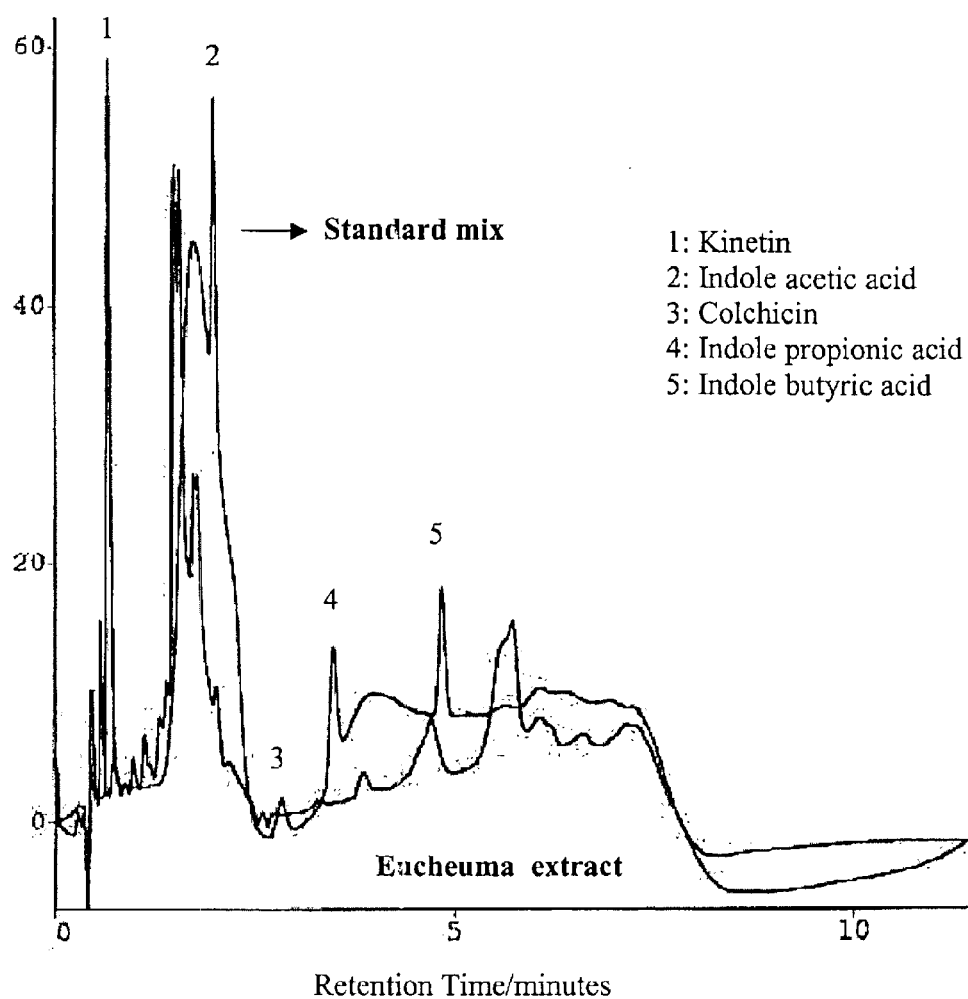
Fig. 1 Comparison of HPLC chromatograms of *Eucheuma* liquid (pH 8.6 extract) with the mixture of standard growth promoting substances.

INTEGRATED METHOD FOR PRODUCTION OF CARRAGEENAN AND LIQUID FERTILIZER FROM FRESH SEAWEEDS

BACKGROUND OF THE INVENTION

1. Field of the Invention

The present invention relates to production of phycocolloid and fertilizer from fresh seaweeds.

Specifically, the invention relates to preparation of κ-carrageenan and liquid fertilizer from fresh *Kappaphycus alvarezii* (also known as *Eucheuma striatum* or *Eucheuma cottonii* or very simply as *Eucheuma*) in a manner that allows integrated recovery of two products from the seaweed simultaneously with other accompanying benefits so as to maximize the returns from cultivation of the seaweed.

2. Background and Prior Art References

κ-Carrageenan is used as a thickening agent in numerous applications such as pet food, fruit jam, toothpaste, and ice cream. The red seaweed, *Kappaphycus alvarezii*, which grows in tropical waters, is cultivated extensively in countries such as the Philippines and Indonesia as a source of κ-carrageenan. J. G. Lewis, N. F. Stanley and G. G. Guist, in the book, *Algae and Human Affairs*, C. A. Lembi and J. R. Waaland, Eds., Cambridge University Press, Cambridge, 1990; pp. 218), have reviewed the diverse applications of refined and semi-refined κ-carrageenan. G. H. Thirkelsen (in: *Industrial Gums—Polysaccharides and their Derivatives*, R. L. Whistler and J. N. BeMiller, Eds., 3$^{rd}$ Edition, Academic Press Inc., New York, 1993, pp 145–180) has also described the diverse applications of carrageenan.

V. J. Chapman and D. J. Chapman have reported in their book, *Seaweeds and their Uses*, (Chapman and Hall, London & New York, 1980; Chapter 2, pp 30–61) that several seaweed extracts are useful as foliar spray for improved plant growth.

G. Blunden (in: Marine Natural Products Chemistry, D. J. Faulkner and W. H. Fenical, Eds., Plenum Press, New York, 1977; pp. 337–344) has provided evidence of cytokinin activity of seaweed extracts while F. C. Sumera and G. J. B. Cjipe (in: *Botanica Marina*, Vol. 24, 157–163, 1981) have reported auxin-like substances in the extracts of *Sargassum polycystum*. B. Metting, W. R. Rayburn and P. A. Raynand (in: *Algae and Human Affairs*, C. A. Lembi and J. R. Waaland, Eds., Cambridge University Press, Cambridge, 1990; pp. 357–370) have reported that many seaweeds contain plant growth regulators such as auxins, gibberellins, abscisic acid and quaternary ammonium compounds.

The red seaweed *Kappaphycus alvarezii* is known as a source of refined and semi-refined κ-carrageenans. *Eucheuma* preparation is also used as foliar spray to enhance flowering and growth of crop. Conventionally, all seaweeds, including *Eucheuma*, are dried at the harvesting location and baled for shipment to processing plants as described by V. J. Chapman and D. J. Chapman in their book, *Seaweeds and their Uses* (Chapman and Hall, London & New York, 1980; Chapter 2, pp 30–61). In most collection areas, sun-drying remains the most cost-effective technique, although oil-fired mechanical dryers are used to a limited extent. The dry seaweed is used mainly for preparation of phycocolloids. Some factories are dedicated to production of seaweed fertilizer. At the cottage industry level—such as in certain coastal villages of India—freshly harvested seaweed is boiled in earthen pots, the liquid extract utilised as fertilizer and the solid residue is either discarded or used as manure.

Reference may be made to Alphons C. J. Voragen, Walter Pilnik, Claus Rolin, Beinta U. Marr, Ian Challen, Abdel Wahab Riad and Rachid Lebbar in Polysaccharides-Carrageenan (Ullmann's Encyclopedia of Industrial Chemistry, Sixth Edition, 2002 Electronic Release) wherein production of κ-carrageenan from *Eucheuma cottonii* (*Kappaphycus alvarezii*) is described as follows: "After being harvested, the algae are washed and dried to a dry matter content of ca. 25 wt. %; . . . The dried algae are treated with alkali and ground to a paste. Alkaline conditions facilitate extraction of the macerated algae." It can be seen that the present practice is to dry the harvested algae and subsequently utilize this dried algae for production of κ-carrageenan. There is no reference to recovery of any liquid fertilizer or second product prior to drying of the harvested seaweed nor is there any mention of any method other than drying for removing water from the fresh algae.

Reference may be made to S. Craigie and C. Leigh (in: *Handbook of Phycological Methods*, Hellebust, J A and Craigie J S., Eds., Cambridge University Press, London, 1978; pp.112) who have reported that red seaweed is used in frozen-fresh condition for extraction of refined carrageenan. However, the authors have not reported the preparation of any fertilizer from the same seaweed.

Reference may be made to Q. Hurtado-Ponce (*Botanica Marina* 38:137, 1995) who has reported that *Kappaphycus alvarezii* (more popularly known as *Eucheuma*) seaweed was harvested, washed and sun/oven dried for recovery of carrageenan. No reference is made to recovery of fertilizer from the same plant.

Reference may be made to G. Lewis, N. F. Stanley and G. G. Guist, (in *Algae and Human Affairs*, C. A. Lembi and J R Waaland, Eds.,Cambridge University Press, Cambridge, 1990; pp. 218) who have reported the extraction of carrageenan by drying of the fresh red sea weed after harvesting. No reference is made to simultaneous recovery of any fertilizer.

C. J. Dawes, N. F. Stanley and D. J. Stancioff (*Botanica Marina*, Vol XX, 1977, Fasc. 3) have also reported that seaweeds are dried in the sun and subsequently utilised for extraction of carrageenan. No mention is made of recovery of fertilizer from the same plant.

P. M. Alino, G. J. B. Cajipe, E. T. Ganzon-Fortes, W. R. Y. Licuanan, N. E. Montano, and L. M. Tupas (in: *The use of marine organisms in folk medicine and horticulture : A preliminary study*, SICEN Leaflet 1. Supplement of SICEN Newsletter, published by Seaweed Information Center (SICEN), Marine Science Institute, University of Philippines, Dilman, Quezon City, Philippines, February 1990), have reported that Eucheuma decoction is used as foliar spray to enhance flowering and growth of crops. However there is no mention of simultaneous recovery of carrageenan from the same seaweed.

L. Tupas and N. E. Montano (in: *Philipp. J. Sci.*, Monograph No. 17, pp 29–35, 1987) have reported the effects of alkaline extracts from Philippine seaweeds as foliar spray on crops. No mention is made of simultaneous recovery of carrageenan from the seaweed.

It is known to those practising the art that effluent generated after recovery of phycocolloids from different seaweeds can be utilised as fertilizer after suitable treatment. It is also known that the harsh conditions under which seaweeds are normally processed for phycocolloid extraction can be detrimental to the growth promoting substances present in the seaweed.

It is also know to those involved in seaweed cultivation that drying of seaweed after harvesting is an involved affair and any savings in the area or time required for drying would be advantageous.

It is also known to those involved in seaweed cultivation and downstream processing that dry seaweeds are bulky and, therefore, costly to transport and store, and any savings in the above would be advantageous.

OBJECTS OF THE INVENTION

The main object of the present invention is to remove and recover the liquid content (sap) of freshly harvested *Kappaphycus alvarezii* by a method of crushing and filtering instead of drying so as obtain sap and a solid residue as two useful products simultaneously and cost-effectively, wherein the sap is a liquid fertilizer and the residue is a superior raw material for recovery of κ-carrageenan than the as-dried whole seaweed.

Another object is to demonstrate the efficacy of the sap as a plant growth-promoting agent.

Yet another object of the present invention is to minimize the time required to dry the seaweed and the area required to spread the seaweed by removing most of the water in the fresh seaweed in the form of sap, leaving only the moist residue to dry.

Yet another object is to show that the κ-carrageenan obtained from the solid residue powder is comparable in quality to that of κ-carrageenan obtained from the conventionally harvested and dried whole seaweed.

Yet another object of the present invention is to show that κ-carrageenan is not lost in the sap and that the quantity of κ-carrageenan obtained from the residue is similar to that from the corresponding weight of dried whole seaweed obtained from an equivalent quantity of fresh seaweed.

Yet another object of the present invention is to produce a κ-carrageenan containing raw material from fresh seaweed that is more compact to transport and store than the dried whole seaweed and also contains (weight by weight) 1.5–2.0 times more κ-carrageenan than the dried whole seaweed.

Yet, another object is to produce the κ-carrageenan-containing raw material with better appearance, low color and in free flowing granular form to simplify its handling and downstream processing.

Yet another object is to show that the κ-carrageenan-containing granules can be used directly without chemical processing for production of gels with satisfactory gel strength.

SUMMARY OF THE INVENTION

The present invention seeks to maximize the utility of *Kappaphycus alvarezii* by obtaining without the need for thermo-chemical cycling or addition of external water two products simultaneously, i.e., a nutrient-rich sap in pristine form that is useful as a plant growth promoter and a free flowing residue in granular form which is easy to transport and store because of its higher compactness, and which contains 1.5–2.0 times more κ-carrageenan (weight by weight) than the conventionally dried whole seaweed. Leaving aside all other advantages of the present invention—namely, a superior raw material for κ-carrageenan that can be produced with minimum energy cost even during monsoon season when solar drying of fresh seaweed is not possible—and focusing instead on the fact that two useful products can be obtained simultaneously through the method of the invention, its economic benefit would be obvious in as much as 60–80 tons of plant growth promoter in the form of sap are obtained from 100 tons of fresh seaweed through the present invention in addition to the normal quantity of κ-carrageenan obtained (as single product) through the conventional method of processing of dry seaweed. Given the obvious economic benefit of the invention, and the fact that the prior art does not disclose any attempt to practice such a process, it would be apparent that the present invention is not obvious.

DETAILED DESCRIPTION OF THE PREFERRED EMBODIMENTS

Accordingly, the present invention provides a process for the preparation of natural seaweed liquid extract and free flowing phycocolloid-containing solid residue by harvesting the seaweed from the open sea; washing the seaweed with clear sea water so as to make it free from silt and extraneous matter, mechanically crushing the fresh seaweed so as to rupture the cell wall and release the sap; filtering the aqueous slurry through muslin cloth; adding a suitable preservative into the sap and diluting the extract for seed and foliar spray applications as appropriate; drying the wet residue in the sun till the moisture content is <25%; extracting phycocolloid from dried residue powder by known methods; alternatively, utilizing the dry residue directly for preparation of gel.

In an embodiment of the present invention, the seaweeds used in the invention were those seaweeds that can be crushed to release sap, including the commercially important red seaweed, *Kappaphycus alvarezii*, and the brown seaweeds, *Sargassum wightii* and *Sargassum tenerrimum* growing on the Indian coast.

In another embodiment of the present invention, the age of the cultivated *Kappaphycus alvarezii* seaweed was 45 days and 90 days at the time of harvesting.

In another embodiment of the present invention, whereas the as-dried *Kappaphycus alvarezii* can be either utilised for K-carrageenan extraction or as potassic manure, both κ-carrageenan and potassium-rich sap containing other growth promoting substances as well can be obtained by processing the fresh seaweed using the integrated methodology.

In another embodiment of the present invention, the sap volume in the fresh seaweed is fully utilised in the form of neat liquid seaweed fertilizer.

In another embodiment of the present invention, the efficacy of the sap from *Kappaphycus alvarezii* was checked on *Vigna radiata* (green gram) and *Hibiscus asthucanthus* (syn. *Abelmoschs esculentus (I) Moench*) (okra) after appropriate dilution.

In another embodiment of the present invention, comparative data on drying times of the seaweed and seaweed residue were obtained for solar drying in open air.

In another embodiment of the present invention, comparative data on yield and gel strength of κ-carrageenan were obtained for conventionally dried whole seaweed and seaweed residue powder as raw materials and processing these both for refined and semi-refined K-carrageenan.

In another embodiment of the present invention, the residue solid containing κ-carrageenan was found to have a creamish-to-pale yellow colour with attactiive appearance, satisfactory shelf life, and which can even be used directly for preparation of gel.

In another embodiment of the present invention, the residue solid containing κ-carrageenan was obtained in compact and free flowing form to reduce transportation cost and inventory space. *Kappaphycus alvarezii* was cultivated in 60 cm×60 cm net bags in Thonithurai, Gulf of Mannar, India and the seaweed was harvested at 45 days and 90 days intervals. The fresh seaweeds contained ca. 90% moisture. The freshly harvested plants were washed thoroughly with seawater to remove all silt and extraneous material, cut into small pieces and homogenized without any extra addition of water. The slurry was then filtered through muslin cloth and the weights of wet residue and sap estimated. The residue was then dried in open sun till the moisture content was <25%. The weight of the dry residue was recorded. The area over which the wet residue was spread for drying and the time required for drying in the open sun were also noted. The dry residue was then processed for preparation of semi-refined or refined κ-carrageenan by known methods involving treatment with 8% aqueous KOH at 75–80° C. or saturated aqueous $Ca(OH)_2$ at 105–109° C., respectively. Gel strength of κ-carrageenan was measured on a Nikkansui-type gel strength tester using 1% carrageenan gel in 1% aqueous KCl at 30° C. The neat sap was treated with preservative and analysed for potassium by flame photometry and for organic growth promoting substances by comparing the HPLC profile (Supelco LC-18-DB Discovery Series column; acetonitrile-water-acetic acid mobile phase (pH 2.8–2.9) containing tetrabutyl ammonium phosphate ion pair agent; 254 nm UV detection) of a suitably prepared solution from the sap (this is done by extraction in ethyl acetate followed by stripping off of the ethyl acetate and dissolution of residue in methylene chloride) with that of a standard solution containing a mixture of growth promoting substances such as kinetin, indole acetic acid, etc. The growth promoting efficacy of the filtrate was evaluated on green gram (Vigna radiata) seeds and seedlings by comparing relative degree of germination and fruiting against untreated seeds and seedlings. It was also evaluated on *Hibiscus asthucanthus* (Okra).

To compare the quality and yield of κ-carrageenan from the residue powder above with those from the conventionally dried whole plants, fresh *Kappaphycus alvarezii* plants were weighed and then dried in the open sun till the moisture content was <25%. The weight of the dried seaweed was recorded. The area over which the plants were spread for drying and the time required for drying in the open sun were also noted. The dry seaweed was processed for extraction of semi-refined or refined κ-carrageenan as mentioned above. The dried seaweed was also ground into a powder and added as fertilizer into soil. $K_2O$ content was measured by flame photometry.

BRIEF DESCRIPTION OF THE DRAWING

FIG. 1 shows a comparison of HPLC chromatogram of *Eucheuma* liquid (pH 8.6 extract) with the mixture of standard growth promoting substances.

The following examples are given by way of illustration and therefore should not be construed to limit the scope of the present invention.

EXAMPLE 1

20 kg of freshly harvested 45 day old *Kappaphycus alvarezii* plants were spread over an area of 150 cm×150 cm on a mat and dried in the open. It took 42 h to obtain a near-constant weight of 2.48 kg of dry seaweed with 20% moisture content. Another 20 kg lot of the fresh seaweed was cut into small pieces, homogenized in a kitchen blender, poured into a bag made of muslin cloth, and the sap squeezed out through the bag. The weight of wet residue was 6.5 kg and the weight of sap was 13.4 kg. The residue was spread over an area of 75 cm×75 cm on a mat and dried in the open. It took 24 h to obtain a near-constant weight of 1.62 kg of dry residue powder with 25% moisture content. It can be seen from this example that drying of the wet residue obtained from 20 kg fresh seaweed requires 25% of the area and 60% of the time required to dry the whole plants. The weight percent K in the dried whole plant and dried solid residue were 12.5% (15% as $K_2O$) and 8.72% (10.5% as $K_2O$) while the concentration of K in the sap was ca. 1.2% (1.45% as $K_2O$). Qualitative evidence of growth promoting substances in the filtrate was also obtained by the HPLC methodology described above and chromatograms are shown in FIG. 1. The sap was optionally concentrated through solar drying and can be concentrated even using RO membrane.

EXAMPLE 2

10 g of the 45-day old dried whole plant of Example 1 was treated with 8% aqueous KOH at 75–80° C. for 3 h to prepare semi-refined carrageenan (SRC). The yield of product after work-up was 43.2% and its gel strength measured under standard conditions was 400 $g/cm^2$. 10 g of the solid powder residue of Example 1 was similarly processed for SRC. The corresponding values of yield and gel strength were 60.0% and 370 $g/cm^2$. Yields were expressed with respect to bone dry raw material.

EXAMPLE 3

20 kg lots of freshly harvested 90-day old seaweed were processed as per the procedure of Example 1 to yield 2.31 kg of dry whole plant in one case, and 1.32 kg of dry solid residue powder and 13.3 kg of sap in the second case. 10 g each of dry whole plant and solid residue powder were processed further for extraction of SRC as per the procedure of Example 2 and the yields obtained were 42.9% and 57.5%, respectively. The corresponding gel strengths were 360 $g/cm^2$ and 390 $g/cm^2$, respectively.

For *Kappaphycus alvarezii* cultivated in the Diu coast, India, 2% washed residue gave a gel strength of 520 $g/cm^2$ whereas 1% gel obtained with SRC prepared from the residue had a gel strength of 515 $g/cm^2$. This suggests that it may be possible to use washed residue directly for certain applications although its usage level relative to SRC may be higher.

EXAMPLE 4

10 g each of 45-day old dry whole plant and solid residue powder of Example 1 were processed separately for extraction of refined carrageenan. The method involved adding 300 mL saturated aqueous $Ca(OH)_2$ solution and cooking in an autoclave at 107° C. and 12 psi pressure for 1 h. The product was precipitated with isopropyl alcohol, filtered and dried. The yields of refined carrageenan from whole plant and residue powder were 28.3% and 47.6%, respectively while the corresponding gel strengths were 600 $g/cm^2$ and 595 $g/cm^2$, respectively. Accounting for moisture content in the dry whole plant and solid residue powder, the yields of κ-carrageenan w.r.t fresh seaweed are approximately comparable, indicating that no κ-carrageenan is lost in the sap.

EXAMPLE 5

Dried whole plants of *Kappaphycus alvarezii* from Example 1—with ca. 15% $K_2O$ content—were ground and then applied to soil in pot experiments with brinjal (egg plant), onion, wheat and sesamum. 5 pots were taken for each crop. The application level of $K_2O$ in the soil was @ 45.0 kg/hectare for brinjal, 60 kg/hectare for onion, 36 kg/hectare for wheat, and 36 kg/hectare for sesamum. Similarly the crops were grown in pots (5 numbers for each crop) without application of the *Eucheuma* seaweed powder. The yields of brinjal, onion bulb, wheat grain and sesamum seed were 1.85 kg, 1.35 kg, 76.7 g and 44.5 g without application of *Eucheuma* whereas the corresponding yields with *Eucheuma* application were 2.61 kg, 1.65 kg, 109.5 g and 59.6 g, respectively; i.e., the yields increased by 41.1%, 22.0%, 42.8% and 34.1%, respectively. The increases in yield with *Eucheuma* seaweed powder were marginally higher than those obtained for SOP (sulphate of potash) addition to the soil keeping $K_2O$ application amount comparable. This suggests that other growth promoting substances/micronutrients in the dry *Eucheuma* seaweed also contribute to growth.

EXAMPLE 6

The sap of Example 1, containing 5% total solids (1.45% as $K_2O$) and growth promoting substances, was diluted with appropriate quantity of water to give diluted extract solutions. When 1 part of the sap was diluted with 99 parts of water, the solution was referred to as 1% and when 10 parts of the sap was diluted with 90 parts of water, the resultant solution was referred to as 10%. In this manner, 1%, 5%, 10%, 25%, 50% and 100% solutions of the sap were prepared.

EXAMPLE 7

Green gram (*Vigna radiata*) seeds were surface sterilized with 0.1% mercuric chloride for 1 min. The seeds were then washed thoroughly in tap water. The seeds were then soaked in tap water or in the *Eucheuma* sap solution of Example 6 for 24 h, spread on the cushion of filter paper in petridishes, and periodically watered with tap water. For each set of experiments with a given sap solution, three petridishes were taken and each dish contained 10 seeds. After seven days, the extent of germination was 90% for the seeds soaked in tap water whereas 100% germination was observed for seeds soaked in 1% extract. Higher concentrations of extract, however, had a deleterious effect on germination, the values being 90%, 73%, and 0% for 5%, 25% and 50% sap solutions, respectively.

EXAMPLE 8

To study the effect of sap solutions of Example 6 on growth and yield of green gram plants, green gram seeds were surface sterilized with 0.1% mercuric chloride for 1 min, washed thoroughly in tap water, and then soaked in tap water overnight (12 h.). Healthy seeds were selected and sown in 100 cm×100 cm plots. 25 seeds were sown in each plot and the sowing date was treated as Day 1. After seven days the number of seedlings per plot was thinned to 10 seedlings to make growth conditions uniform. The mean day/night temperatures during the study period were 28–33° C./22–24° C., and the maximum photosynthetically active radiation (PAR) (400–700 nm) was around 175 W/m². Fresh sap solutions of Example 6 were sprayed on the plants using a hand pump and care was taken to ensure uniform spreading of the solution on the entire plant surface. Growth of the plants was retarded when the concentration of sap solution was >50% whereas the growth was enhanced when the concentration was 5–25% (Table 1).

TABLE 1A

Height (in cm) of Green Gram plants (10 plants per plot) raised in 100 cm × 100 cm plots. The data was recorded on 45th day after sowing.

| Treatment | 0% | 1.0% | 5.0% | 10.0% | 25.0% |
|---|---|---|---|---|---|
| Control | 15.2 ± 3.29 | — | — | — | — |
| Weekly | — | 14.8 ± 3.3 | 15.4 ± 4.16 | 19.3 ± 4.52 | 14.5 ± 4.79 |
| Fortnightly | — | 10.4 ± 4.77 | 10.7 ± 8.15 | 22.0 ± 6.2 | 12.55 ± 5.07 |
| Monthly | — | 5.6 ± 2.3 | 14.0 ± 5.29 | 20.3 ± 5.88 | 18.5 ± 6.02 |

TABLE 1B

Number of Inflorescence Observed on 45th day after sowing

| Treatment | 0% | 1.0% | 5.0% | 10.0% | 25.0% |
|---|---|---|---|---|---|
| Control | Nil | — | — | — | — |
| Weekly | — | 8 | 8 | 10 | 6 |
| Fortnightly | — | 5 | 5 | 7 | 6 |
| Monthly | — | 2 | 3 | 5 | 4 |

TABLE 1C

Total number of pods per plot (each plot comprising 10 Green Gram plants) on 45th day

| Treatment | 0% | 1.0% | 5.0% | 10.0% | 25.0% |
|---|---|---|---|---|---|
| Control | Nil | — | — | — | — |
| Weekly | — | 3 | 8 | 7 | 6 |
| Fortnightly | — | Nil | 8 | 19 | 3 |
| Monthly | — | Nil | 3 | 10 | 6 |

TABLE 1D

Average Length of Pod (in cm) on 45th Day

| Treatment | 0% | 1.0% | 5.0% | 10.0% | 25.0% |
|---|---|---|---|---|---|
| Control | Nil | — | — | — | — |
| Weekly | — | 5.33 ± 1.52 | 3.75 ± 1.58 | 4.92 ± 2.21 | 3.83 ± 1.57 |
| Fortnightly | — | Nil | 4.0 ± 2.03 | 6.1 ± 2.03 | 6.5 ± 1.0 |
| Monthly | — | Nil | 6.5 ± 0.5 | 4.7 ± 2.62 | 6.5 ± 1.0 |

EXAMPLE 9

Table 2 gives data summarizing seed yield on 75th day of green gram plants of Example 8 subjected to fortnightly spraying with different concentrations of fresh Eucheuma sap. As can be seen from the Table, plants subjected to spraying with 10% sap showed maximum extent of fast maturation.

TABLE 2

Effect of Fortnightly Spraying of Fresh
Seaweed Liquid extract on Green Gram Seed
Yield as monitored on 75th day after sowing.

| Treatment | Number of dried pods per plot | Seed weight per pod (g) | Average seed weight per plot (g) |
| --- | --- | --- | --- |
| Control | 42 | 0.713 ± 0.171 | 29.9 |
| 1% | 43 | 0.651 ± 0.12 | 28.0 |
| 5% | 56 | 0.750 ± 0.16 | 42.0 |
| 10% | 91 | 0.821 ± 0.14 | 74.7 |
| 25% | 61 | 0.665 ± 0.18 | 40.6 |

EXAMPLE 10

The original sap of Example 1 was preserved with 2% methanol and the diluted sap solution prepared as per the example of Example 6 was used as foliar spray after adding 0.05% of wetting agent (Dhenuvita brand, India). *Hibiscus asthucanthus* (Okra) was grown in earthen pots (15 numbers) containing sandy loam soil having its NPK requirement as per conventional practice. After 25 days, 5 plants were maintained as control, 5 plants were foliar sprayed with 5% sap and another 5 plants with 10% sap. A total of five applications were given over the crop duration, which, in the case of spraying with 5% sap, amounted to a usage level of 17 liters/hectare/spray application of original sap, assuming 35,000 plants per hectare. The number of Okra fruits was 50, 53 and 54 for 0%, 5% and 10% sap application while the total fruit weight was 0.45 kg, 0.53 kg and 0.54 kg, respectively.

EXAMPLE 11

To illustrate that either fresh seaweeds may also be subjected to homogenization to release sap, 3.2 kg of *Sargassum wightii* was harvested and the fresh weed was homogenized in a blender as described in the procedure of Example 1. 0.8 kg of sap was obtained while the weight of the wet solid residue was 2.2 kg.

The main advantages of the present invention are:

The integrated process as illustrated with *Kappaphycus alvarezii* allows both κ-carrageenan and liquid seaweed fertilizer to be recovered from fresh seaweed which would make cultivation of the seaweed more lucrative. For a one hectare area of cultivation—which conservatively yields 100 tons of fresh biomass per annum—60–80 tons of liquid biofertilizer can be produced in addition to 2.5–4.5 tons of κ-carrageenan, depending on the grade.

(ii) The sap—which has proven efficacy as biofertilizer—is obtained without thermo-chemical cycling and external addition of water. It may be marketed directly requiring no further processing other than addition of preservatives.

(iii) Simple equipment such as a grinder-cum-mixer and a press filter installed preferably near the site of harvesting may suffice for homogenizing the fresh seaweed and allowing sap to be separated.

(iv) As compared to the ca. 850–900 kg water that needs to be removed from one ton of fresh *Kappaphycus alvarezii* as per the conventional method of drying the whole plant, only the moisture in the wet residue—amounting to 100–200 kg per ton of fresh seaweed—needs to be removed as per the method of the invention thereby greatly reducing drying time and area.

(v) The free flowing, granular residue obtained from the fresh plant is superior to dried whole plant as raw material for κ-carrageenan since the former is less bulky, easy to transport, easy to store, easy to handle, contains very little colour, has a higher κ-carrageenan content, and can even be used directly for gel formation in certain applications.

What is claimed is:

1. A novel integrated process for the preparation of seaweed liquid fertilizer and free flowing phycocolloid-containing solid residue, said process consisting of steps performed in the order of:
   a. harvesting seaweed from the sea and removing silt and extraneous matter;
   b. homogenizing the seaweed in a grinder-cum-mixer to obtain a slurry;
   c. filtering the resultant slurry to obtain a powder residue and a sap separately;
   d. drying the wet powder residue till the moisture content is <25 weight %,
   e. extracting phycocolloid from dried powder residue by known methods or alternatively using it directly in certain applications;
   f. adding a suitable preservative into the sap and optionally concentrating the sap to reduce volume for lower packaging and transport cost,
   and optionally, g. diluting the sap and adding suitable wetting agent for seed and foliar spray applications as appropriate.

2. A process as claimed in claim 1, wherein in step (c) the filtering is done using a muslin cloth or a filter press.

3. A process as claimed in claim 1, wherein in step (d) solar drying of wet powder residue is carried out.

4. A process as claimed in claim 1, wherein in step (f) the sap is concentrated through a solar evaporation or membrane processes.

5. A process as claimed in claim 1, wherein the seaweed is selected from the class of red and brown seaweed.

6. A process as claimed in claim 1, wherein the sap from fresh seaweed is obtained by breaking cells of the seaweed with the help of mechanical action of a device, a grinder-cum-mixer, or sugar cane juice expeller.

7. A process as claimed in claim 1, wherein the sap can be separated by known methods of filtration, filtration through a muslin cloth or filter press or through the method of centrifugation.

8. A process as claimed in claim 1, wherein the filtered sap contains 0.1–2.0% $K_2O$, micronutrients and growth promoting substances.

9. A process as claimed in claim 1, wherein the sap considered as 100% in concentration is diluted with water to a concentration (v/v) of 0.1–100%.

10. A process as claimed in claim 1, wherein a preservative, a buffering agent, formaldehyde, alcohol or sodium benzoate is added to the sap or its dilutions in the range of 0.1–5% w/v.

11. A process as claimed in claim 1, wherein the sap can be concentrated either through evaporation or membrane-based dewatering to reduce volume and, if desired, converted into a solid form of biofertilizer with yield of 25–100 g per litre of sap.

12. A process as claimed in claim 1, wherein the powder residue after separation of sap can be used as raw material for recovery of phycocolloids.

13. A process as claimed in claim 1, wherein the water content of the fresh seaweed is substantially expelled along with the sap thereby making the powder residue amenable to drying by artificial methods during monsoon period or, where open air-drying is possible, reducing drying time by 10–80% and area required for drying by 20–80% as compared to the requirements for fresh whole seaweed.

14. A process as claimed in claim 1, wherein the phycocolloid content in dry powder residue is 10–100% higher than in the dried whole seaweed.

15. A process as claimed in claim 1, wherein the gel strength of phycocolloid is comparable to that of phycocolloid obtained from dried whole seaweed.

16. A process as claimed in claim 1, wherein the powder residue is 1.5–5.0 times more compact than the whole dry seaweed and therefore less expensive to transport and store.

17. A process as claimed in claim 1, wherein the powder residue of *Kappaphycus alvarzii* is depigmented and is also obtained in free flowing granular form that improves the ease of handling for packaging, transportation and downstream processing.

18. A process as claimed in claim 1, wherein the powder residue can be used directly for gel preparation in certain applications.

19. A process as claimed in claim 1, wherein, for a typical production of 100–200 tons fresh *Kappaphycus alvarezii* per hectare of cultivation, and 75–150 tons of liquid biofertilizer sap is obtained as second product besides the 7–14 tons of granular dry powder residue from which refined κ-carrageenan is produced in similar quantity of 3–6 tons as from the dried whole seaweed, thereby increasing the overall value of the fresh seaweed.

20. A process as claimed in claim 9, wherein the sap considered as 100% in concentration is diluted with water to a concentration (v/v) of 0.1–10%.

21. A process as claimed in claim 10, wherein the sap is fine filtered and sterilized.

22. A process as claimed in claim 5, wherein the seaweed is *Kappaphycus alvarezii* or *Sargassum wightii* or both.

23. A process as claimed in claim 22, wherein the seaweed is crushed to release sap.

* * * * *